United States Patent
Xu

(10) Patent No.: US 11,348,498 B2
(45) Date of Patent: May 31, 2022

(54) STRETCHABLE DISPLAY PANEL AND DISPLAY METHOD THEREOF, AND DISPLAY DEVICE

(71) Applicants: Chengdu BOE Optoelectronics Technology Co., Ltd., Sichuan (CN); BOE TECHNOLOGY GROUP CO., LTD., Beijing (CN)

(72) Inventor: Yuanjie Xu, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/964,434

(22) PCT Filed: Jan. 14, 2020

(86) PCT No.: PCT/CN2020/072028
§ 371 (c)(1),
(2) Date: Jul. 23, 2020

(87) PCT Pub. No.: WO2020/147722
PCT Pub. Date: Jul. 23, 2020

(65) Prior Publication Data
US 2021/0049944 A1 Feb. 18, 2021

(30) Foreign Application Priority Data
Jan. 15, 2019 (CN) .......................... 201910035501.6

(51) Int. Cl.
*G06F 3/041* (2006.01)
*G09G 3/00* (2006.01)
*G09G 3/22* (2006.01)

(52) U.S. Cl.
CPC ......... *G09G 3/035* (2020.08); *G06F 3/04164* (2019.05); *G09G 3/22* (2013.01);
(Continued)

(58) Field of Classification Search
CPC .... G09G 3/035; G09G 3/22; G09G 2300/043; G09G 2300/0439; G09G 2320/0233;
(Continued)

(56) References Cited

U.S. PATENT DOCUMENTS 9,756,723 B2 9/2017 Hong et al.
9,804,699 B2 10/2017 Hyun et al.
(Continued)

FOREIGN PATENT DOCUMENTS

CN 103295510 A 9/2013
CN 104464620 A 3/2015
(Continued)

OTHER PUBLICATIONS

International Search Report of PCT/CN2020/072028 in Chinese, dated Apr. 13, 2020 with English Translation.
(Continued)

*Primary Examiner* — Towfiq Elahi
(74) *Attorney, Agent, or Firm* — Collard & Roe, P.C.

(57) ABSTRACT

A stretchable display panel and a display method thereof, and a display device are provided. The stretchable display panel includes pixel units arranged in an array, compensating pixels located at a gap between the plurality of pixel units, a stretch detecting member corresponding to the compensating pixels and a control unit respectively and electrically connected with the stretch detecting member and the compensating pixels. The stretch detecting member includes a material that is capable of generating an electrical detecting signal when being stretched, so that the stretch detecting member is capable of generating a detecting signal
(Continued)

when being stretched; the control unit is configured to determine stretch information of the stretchable display panel according to the detecting signal generated when the stretch detecting member is stretched, and supply a compensating voltage to the compensating pixel according to the stretch information.

15 Claims, 4 Drawing Sheets

(52) U.S. Cl.
CPC .............. *G06F 2203/04102* (2013.01); *G09G 2300/043* (2013.01); *G09G 2300/0439* (2013.01); *G09G 2320/0233* (2013.01); *G09G 2340/0407* (2013.01); *G09G 2380/02* (2013.01)

(58) Field of Classification Search
CPC ........ G09G 2340/0407; G09G 2380/02; G06F 3/04164; G06F 2203/04102
See application file for complete search history.

(56) References Cited

U.S. PATENT DOCUMENTS

| | | | |
|---|---|---|---|
| 10,283,092 B2 | 5/2019 | Du | |
| 2009/0121983 A1 | 5/2009 | Sung et al. | |
| 2014/0306985 A1* | 10/2014 | Jeong | G09G 5/06 345/601 |
| 2015/0116608 A1* | 4/2015 | Jeong | G06F 3/0446 349/12 |
| 2015/0262529 A1 | 9/2015 | Lee et al. | |
| 2016/0077553 A1* | 3/2016 | Hyun | G06F 3/045 345/690 |
| 2018/0120615 A1* | 5/2018 | Wang | G06F 3/0446 |
| 2018/0190190 A1* | 7/2018 | Xi | G09G 3/3225 |
| 2018/0247985 A1 | 8/2018 | Jeon et al. | |
| 2018/0364838 A1 | 12/2018 | Hong et al. | |
| 2020/0066211 A1* | 2/2020 | Lee | G09G 3/3275 |
| 2020/0143729 A1 | 5/2020 | Xu | |
| 2020/0193899 A1 | 6/2020 | Li et al. | |
| 2020/0401191 A1* | 12/2020 | Lee | G06F 1/1656 |

FOREIGN PATENT DOCUMENTS

| | | |
|---|---|---|
| CN | 105575309 A | 5/2016 |
| CN | 105761619 A | 7/2016 |
| CN | 106910842 A | 6/2017 |
| CN | 107331343 A | 11/2017 |
| CN | 107491206 A | 12/2017 |
| CN | 108492762 A | 9/2018 |
| CN | 208189154 U | 12/2018 |
| CN | 109473057 A | 3/2019 |
| JP | 2001-311960 A | 11/2001 |

OTHER PUBLICATIONS

Notice of Transmittal of the International Search Report of PCT/CN2020/072028 in Chinese, dated Apr. 13, 2020.
Written Opinion of the International Searching Authority of PCT/CN2020/072028 in Chinese, dated Apr. 13, 2020.
International Search Report of PCT/CN2019/077295 in Chinese, dated May 30, 2019, with English translation.
International Preliminary Report on Patentability of PCT/CN2019/077295, dated Oct. 13, 2020 and English Translation of the Written Opinion of the International Searching Authority of PCT/CN2019/077295 in Chinese, dated May 30, 2019.
Chinese Office Action in Chinese Application No. 201810311914.8, dated Dec. 18, 2019 with English translation.
First Office Action in U.S. Appl. No. 16/609,016 dated Oct. 28, 2020.

\* cited by examiner

STRETCHABLE DISPLAY PANEL AND DISPLAY METHOD THEREOF, AND DISPLAY DEVICE

CROSS REFERENCE TO RELATED APPLICATIONS

This application is the National Stage of PCT/CN2020/072028 filed on Jan. 14, 2020, which claims priority under 35 U.S.C. § 119 of Chinese Application No. 201910035501.6 filed on Jan. 15, 2019 the disclosure of which is incorporated by reference.

TECHNICAL FIELD

Embodiments of the present disclosure relate to a stretchable display panel and a display method thereof, and a display device.

BACKGROUND

Stretchable display panels can generate different forms according to needs due to functions such as stretchability and foldability, can be widely used in fields such as foldable display devices and wearable display devices, and have been receiving more and more attention. Generally speaking, a display effect of the stretchable display panel after being stretched is an important indicator to measure quality of the stretchable display panel.

SUMMARY

At least one embodiment of the present disclosure provides a stretchable display panel, the stretchable display panel includes: a plurality of pixel units, arranged in an array; a plurality of compensating pixels, located at a gap between the plurality of pixel units; a stretch detecting member, corresponding to the plurality of compensating pixels and including a material that is capable of generating an electrical detecting signal when being stretched, so that the stretch detecting member is capable of generating a detecting signal when being stretched; and a control unit respectively, electrically connected with the stretch detecting member and the plurality of compensating pixels, and the control unit is configured to determine stretch information of the stretchable display panel according to the detecting signal generated when the stretch detecting member is stretched, and supply a compensating voltage to the compensating pixel according to the stretch information.

For example, in the stretchable display panel provided by at least one embodiment of the present disclosure, the stretch information includes a stretched position and a stretch degree of the stretchable display panel; the control unit is configured to determine a compensating voltage of the compensating pixel at the stretched position, according to light-emitting brightness of a pixel unit and the stretch degree at the stretched position, and input the determined compensating voltage to the compensating pixel at the stretched position, so as to compensate for the light-emitting brightness of the pixel unit at the stretched position.

For example, in the stretchable display panel provided by at least one embodiment of the present disclosure, each of the plurality of compensating pixels includes a compensating pixel electrode, and each of the compensating pixel electrodes is connected with the control unit through at least one first detecting line; and the first detecting line is multiplexed as the stretch detecting member.

For example, in the stretchable display panel provided by at least one embodiment of the present disclosure, each of the plurality of compensating pixels includes a compensating pixel electrode, and each of the compensating pixel electrodes is connected with the control unit through at least one first detecting line; and the compensating pixel electrode is multiplexed as the stretch detecting member, or both the first detecting line and the compensating pixel electrode are multiplexed as the stretch detecting member.

For example, in the stretchable display panel provided by at least one embodiment of the present disclosure, an extension direction of the first detecting line is a same as a first stretchable direction of the stretchable display panel.

For example, the stretchable display panel provided by at least one embodiment of the present disclosure further comprises a plurality of touch electrodes, each of the touch electrodes is connected with the control unit through at least one second detecting line; and the second detecting line is multiplexed as the stretch detecting member.

For example, the stretchable display panel provided by at least one embodiment of the present disclosure further comprises a plurality of touch electrodes, each of the touch electrodes is connected with the control unit through at least one second detecting line; and the touch electrode is multiplexed as the stretch detecting member, or both the second detecting line and the touch electrode are multiplexed as the stretch detecting member.

For example, in the stretchable display panel provided by at least one embodiment of the present disclosure, an orthogonal projection position of each of the plurality of touch electrodes on the display panel is in one-to-one correspondence with an orthogonal projection position of each of the plurality of compensating pixels on the display panel.

For example, in the stretchable display panel provided by at least one embodiment of the present disclosure, an orthogonal projection position of each of the plurality of touch electrodes on the display panel corresponds to orthogonal projection positions of two or more of the plurality of compensating pixels on the display panel.

For example, in the stretchable display panel provided by at least one embodiment of the present disclosure, an extension direction of the second detecting line is a same as a first stretchable direction of the stretchable display panel.

For example, in the stretchable display panel provided by at least one embodiment of the present disclosure, the plurality of pixel units are arranged in a plurality of rows and a plurality of columns; and one column of the compensating pixels are disposed at a gap between two adjacent columns of the pixel units.

For example, in the stretchable display panel provided by at least one embodiment of the present disclosure, one column of the compensating pixels are disposed at a gap between any two adjacent columns of the pixel units.

For example, in the stretchable display panel provided by at least one embodiment of the present disclosure, a size of the compensating pixel in the row direction is less than or equal to a size of the pixel unit in the row direction.

For example, in the stretchable display panel provided by at least one embodiment of the present disclosure, one row of the compensating pixels are disposed at a gap between any two adjacent rows of the pixel units.

For example, in the stretchable display panel provided by at least one embodiment of the present disclosure, a size of the compensating pixel in the row direction is less than or equal to a size of the pixel unit in the row direction; and a size of the compensating pixel in the column direction is less than or equal to a size of the pixel unit in the column direction.

For example, in the stretchable display panel provided by at least one embodiment of the present disclosure, a material of the stretch detecting member includes a power generation yarn or a polyimide film.

At least one embodiment of the present disclosure provides a display device, the display device comprises any stretchable display panel as mentioned above.

At least one embodiment of the present disclosure provides a display method of the stretchable display panel as mentioned above, the display method comprises: receiving a detecting signal generated by a stretch detecting member; determining stretch information of the stretchable display panel according to the detecting signal; and supplying a compensating voltage to a compensating pixel according to the stretch information.

For example, in the display method of the stretchable display panel provided by at least one embodiment of the present disclosure, the stretch information includes a stretched position and a stretch degree of the stretchable display panel; and the supplying a compensating voltage to a compensating pixel according to the stretch information, includes: determining the compensating voltage of the compensating pixel at the stretched position according to light-emitting brightness of a pixel unit and the stretch degree at the stretched position; inputting the determined compensating voltage to the compensating pixel at the stretched position, and compensating for the light-emitting brightness of the pixel unit at the stretched position.

For example, in the display method of the stretchable display panel provided by at least one embodiment of the present disclosure, the determining the compensating voltage of the compensating pixel, includes: the greater the received detecting signal, the larger the compensating voltage of the compensating pixel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
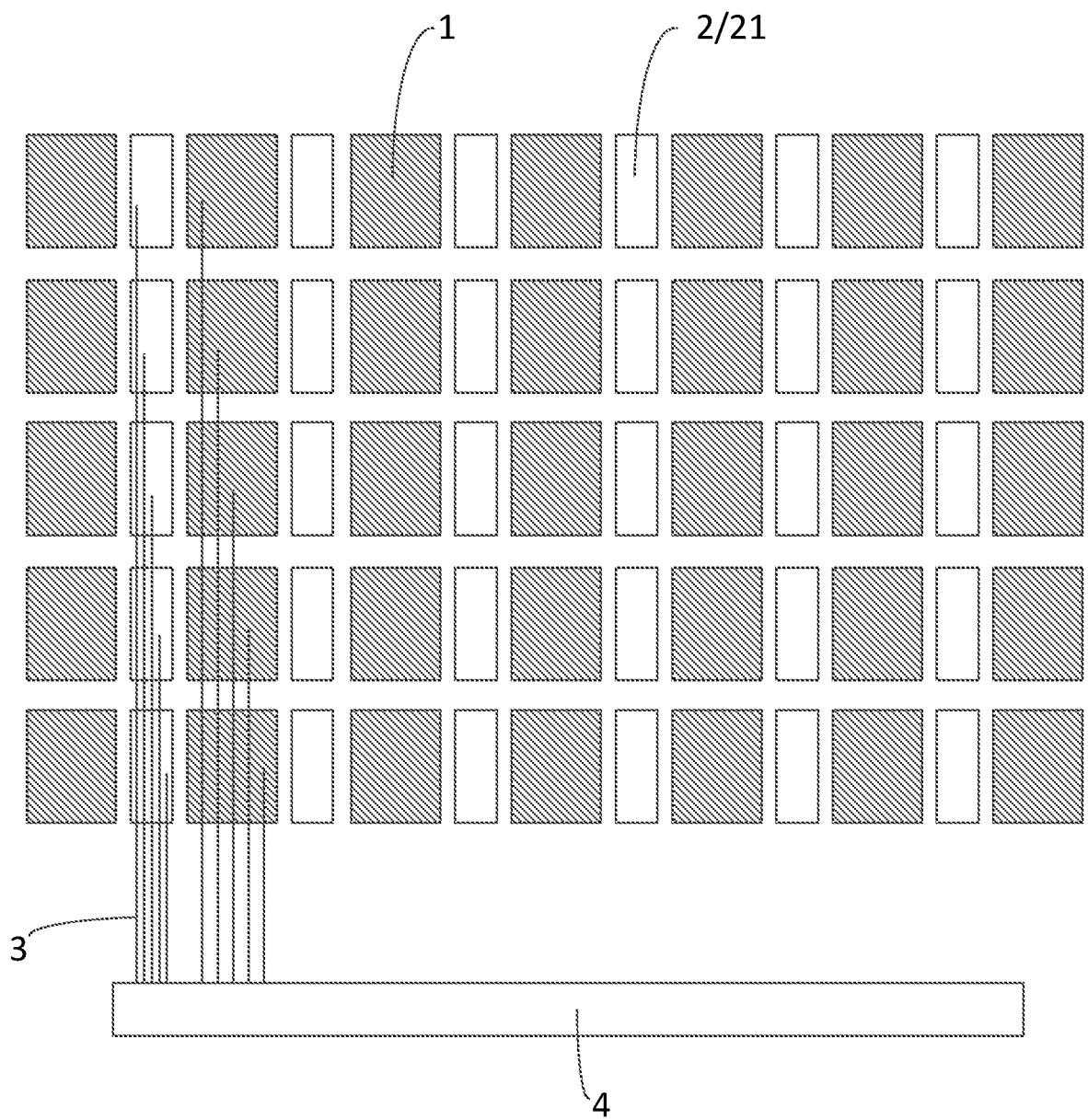
FIG. 1 is a structural schematic diagram of a stretchable display panel provided by at least one embodiment of the present disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Generally speaking, after a stretchable display panel is stretched, a distance between respective pixel units in the stretchable display panel will change, for example, a distance along a stretching direction will become larger, which reduces display resolution of the stretchable display panel, makes display resolution of the stretchable display panel different before and after stretching, and further reduces user experience.

At least one embodiment of the present disclosure provides a stretchable display panel and a display method thereof, and a display device; the stretchable display panel comprises: a plurality of pixel units arranged in an array, a plurality of compensating pixels located at a gap between pixel units, a stretch detecting member corresponding to the compensating pixel, and a control unit respectively electrically connected with the stretch detecting member and the compensating pixel; the stretch detecting member includes a material that can generate an electrical detecting signal when being stretched, so that the stretch detecting member can generate a detecting signal when being stretched; and the control unit is configured to determine stretch information of the stretchable display panel according to the detecting signal generated when the stretch detecting member is stretched, and supply a compensating voltage to the compensating pixel according to the stretch information. The stretchable display panel may compensate for display resolution after being stretched, so that a display effect of the stretchable display panel before and after stretching is maintained substantially consistent, thereby improving user experience.

Hereinafter, the stretchable display panel and the display method thereof, and the display device provided by the embodiments of the present disclosure will be described in detail in conjunction with the accompanying drawings.

FIG. 1 shows a structural schematic diagram of a stretchable display panel provided by at least one embodiment of the present disclosure. As shown in FIG. 1, the stretchable display panel comprises: a plurality of pixel units 1 arranged in an array, a plurality of compensating pixels 2 located at a gap between pixel units 1, and a stretch detecting member (which is implemented by a first detecting line 3, etc. shown in the figure) corresponding to the compensating pixel 2, and a control unit 4 electrically connected with the stretch detecting member and the compensating pixel 2. The stretch detecting member includes a material that can generate an electrical detecting signal when being stretched, so that the stretch detecting member can generate a detecting signal when being stretched; and the control unit 4 is configured to determine stretch information of the stretchable display panel according to the detecting signal generated when the stretch detecting member is stretched, and supply a compensating voltage to the compensating pixel according to the stretch information.

For example, in some embodiments, the stretch information of the stretchable display panel includes a stretched position and a stretch degree of the stretchable display panel; at this time, the control unit may be configured to determine the stretched position and the stretch degree of the stretchable display panel according to the detecting signal generated when the stretch detecting member is stretched; determine a compensating voltage of the compensating pixel at the stretched position, according to light-emitting brightness of a pixel unit and the stretch degree at the stretched position; and input the determined compensating voltage to the compensating pixel at the stretched position, so as to compensate for the light-emitting brightness of the pixel unit at the stretched position.

Thus, in the stretchable display panel provided by the embodiment of the present disclosure, the compensating pixel is provided at the gap between the pixel units; when the stretchable display panel is stretched in a display state, the stretch information, for example, the stretched position and the stretch degree, of the stretchable display panel, may be determined according to the detecting signal generated when the stretch detecting member is stretched; the compensating voltage of the compensating pixel at the stretched position is determined according to the light-emitting brightness of the pixel unit and the stretch degree at the stretched position; and the compensating voltage is input to the compensating pixel to implement light emission of the compensating pixel; so, although an interval between adjacent pixel units increases during stretching, yet light emission of the compensating pixel may solve the problem of reduced resolution of the stretchable display panel after being stretched, so that the display panel has similar resolution before and after being stretched, which improves a display effect of a picture, and improves user experience.

It should be noted that, the detecting signal according to the embodiment of the present disclosure is an electrical detecting signal generated when the stretch detecting member is stretched. For example, when the stretchable display panel is stretched, the stretch detecting member is also stretched, so that the stretch detecting member generates electric charges, and the electric charges may be transferred to the control unit through the detecting line, that is, the control unit receives the electrical detecting signal generated when the stretch detecting member is stretched.

For example, in some embodiments, each compensating pixel 2 includes a compensating pixel electrode 21, and each compensating pixel electrode 21 is connected with the control unit 4 through at least one first detecting line 3 (FIG. 1 only illustrates first detecting lines 3 correspondingly connected with one column of compensating pixel electrodes 21, and of course, other respective columns of compensating pixel electrodes 21 are also coupled to the control unit 4 through corresponding first detecting lines 3). For example, the first detecting line 3 may be multiplexed as the stretch detecting member; or, in other embodiments, the compensating pixel electrode 21 may be multiplexed as the stretch detecting member; or, in other embodiments, both the first detecting line 3 and the compensating pixel electrode 21 may be multiplexed as the stretch detecting member.

For example, in some embodiments, as shown in FIG. 1, an extension direction of the first detecting line 3 is the same as a first stretchable direction of the stretchable display panel; and the first stretchable direction is, for example, a common stretching direction of the stretchable display panel, for example, a stretching direction when the stretchable display substrate is folded or a stretching direction generated when the stretchable display substrate is worn. For example, when the first detecting line 3 is multiplexed as the stretch detecting member, the first detecting line 3 is made of a material that can generate an electrical detecting signal when being stretched, so that the first detecting line 3 can generate a detecting signal when being stretched. For example, when the stretchable display panel is stretched along a column direction (i.e., a vertical direction in the figure), the first detecting line 3 is also stretched along the column direction, and at this time, the first detecting line 3 may generate the detecting signal, and transmit the same to the control unit 4; the control unit 4 receives the detecting signal, and determines the stretch information of the stretchable display panel, for example, the stretched position and the stretch degree of the stretchable display panel, according to a magnitude of the detecting signal. For example, the greater the detecting signal generated by the first detecting line 3, which demonstrates the greater the stretch degree of the stretchable display panel, and the larger the compensating voltage that the control unit 4 inputs to the compensating pixel electrode 21 through the first detecting line 3; so the control unit 4 may determine the compensating voltage of the compensating pixel electrode 21 at the stretched position according to the light-emitting brightness of the pixel unit land the stretch degree at the stretched position.

For example, each pixel unit 1 has certain light-emitting brightness before stretching; after the stretchable display panel is stretched, each pixel unit 1 will lose a portion of the light-emitting brightness; there is a correspondence relationship between the loss amount and the stretch degree of the stretchable display panel, the greater the stretch degree of the stretchable display panel, the greater the loss amount. For example, the stretch degree of the stretchable display panel is divided into three levels of 1, 2 and 3 which gradually increase; when the stretch degree is 1, the pixel unit 1 loses 10% of the light-emitting brightness before stretching; when the stretch degree is 2, the pixel unit 1 loses 20% of the light-emitting brightness before stretching; and when the stretch degree is 3, the pixel unit 1 loses 30% of the light-emitting brightness before stretching; so, the control unit 4 may determine brightness loss amounts of the respective pixel units 1 at the stretched position according to the stretch degrees, so that the control unit 4 may determine a magnitude of a corresponding compensating voltage input to a corresponding compensating pixel electrode 21 according to the brightness loss amount, to make light-emitting brightness of the compensating pixel close to brightness lost by the pixel unit 1, and in this way, after compensation, display effects of the stretchable display panel before and after stretching may be made close, which can maintain display quality of the stretchable display panel to a largest extent.

It should be noted that, in the embodiment of the present disclosure, the column direction of the pixel unit is shown as the vertical direction in the figure, and a row direction of the pixel unit is shown as a horizontal direction in the figure; in other embodiments of the present disclosure, the column direction and the row direction of the pixel unit may be interchanged, and specific setting of the column direction and the row direction will not be limited in the embodiment of the present disclosure.

For example, in some embodiments, when the compensating pixel electrode 21 is multiplexed as the stretch detecting member, only the compensating pixel electrode 21 needs to be made of a material that can generate an electrical detecting signal when being stretched, so that when the stretchable display panel is stretched, the compensating pixel electrode 21 may generate a detecting signal; the detecting signal is transmitted to the control unit 4 through the first detecting line 3; and the control unit 4 receives the detecting signal, determines the stretched position and the stretch degree of the stretchable display panel according to a magnitude of the detecting signal, determines a magnitude of the compensating voltage of the compensating pixel electrode 21 at the stretched position according to the light-emitting brightness of the pixel unit 1 and the stretch degree at the stretched position, and supply the compensating voltage to the compensating pixel electrode 21. A compensation principle of using the compensating pixel electrode as the stretch detecting member is the same as the above-described principle of using the first detecting line 3 as the stretch detecting member, the above-described embodiments may be referred to for details, which will not be repeated here.

For example, in some embodiments, the first detecting line and the compensating pixel electrode may be multiplexed as the stretch detecting member at a same time; at this time, both the first detecting line 3 and the compensating pixel electrode 21 are made of a material that can generate an electrical detecting signal when being stretched, so that both the first detecting line 3 and the compensating pixel electrode 21 can generate detecting signals when the stretchable display panel is stretched; and then the control unit receives the detecting signals, determines the stretched position and the stretch degree of the stretchable display panel according to magnitudes of the detecting signals, determines a magnitude of the compensating voltage for the compensating pixel electrode 21 at the stretched position according to the light-emitting brightness of the pixel unit 1 and the stretch degree at the stretched position, and supply the compensating voltage to the compensating pixel electrode 21. A compensation principle of using the first detecting line 3 and the compensating pixel electrode 21 as the stretch detecting member is the same as the above-described principle of using the first detecting line as the stretch detecting member, the above-described embodiments may be referred to for details, which will not be repeated here.

For example, in some embodiments, each compensating pixel electrode 21 is connected with the control unit 4 through one first detecting line 3, so when the stretchable display panel is partially stretched, the stretchable display panel may only perform luminescence compensation on a pixel unit at a partially stretched position, that is, luminescence compensation at the partially stretched position may be implemented only by individually inputting a compensating voltage to a compensating pixel corresponding to the partially stretched pixel unit, without inputting the compensating voltage to all the compensating pixels, which thus can reduce power consumption.

For example, in some embodiments, each row or each column of compensating pixels may also be connected with a same one first detecting line, which thus can simplify circuit arrangement in the stretchable display substrate.

For example, in the above-described stretchable display panel provided by the embodiment of the present disclosure, one column of compensating pixels may be provided at a gap between two adjacent columns of pixel units, or one row of compensating pixels may also be provided at a gap between two adjacent rows of pixel units. At this time, the one column of compensating pixels or the one row of compensating pixels may be provided at a position where the stretchable display substrate is frequently stretched, for example, a folded position when the stretchable display substrate is folded, or a position that needs to be stretched when the stretchable display substrate is worn.

For example, in some examples, one column of compensating pixels may be provided at a gap between any two adjacent columns of pixel units, and one row of compensating pixels may be provided at a gap between any two adjacent rows of pixel units, so that brightness after the stretchable display substrate is stretched may be fully compensated for. For example, when the stretchable display panel is stretched along the row direction, compensating pixels between adjacent two rows of pixel units will emit light; when the stretchable display panel is stretched along the column direction, compensating pixels between two adjacent columns of pixel units will emit light; and when the stretchable display panel is stretched along the row direction and the column direction simultaneously, both compensating pixels between two adjacent rows of pixel units and compensating pixels between two adjacent columns of pixel units will emit light. Therefore, regardless of whether the stretchable display panel is stretched along the row direction or the column direction, a distance between any two adjacent rows or any two adjacent columns of light-emitting pixel units will not be too large, so as to ensure that graininess will not be generated at any position of the stretchable display panel due to reduced resolution, and ensure uniformity of display.

Figure 2:
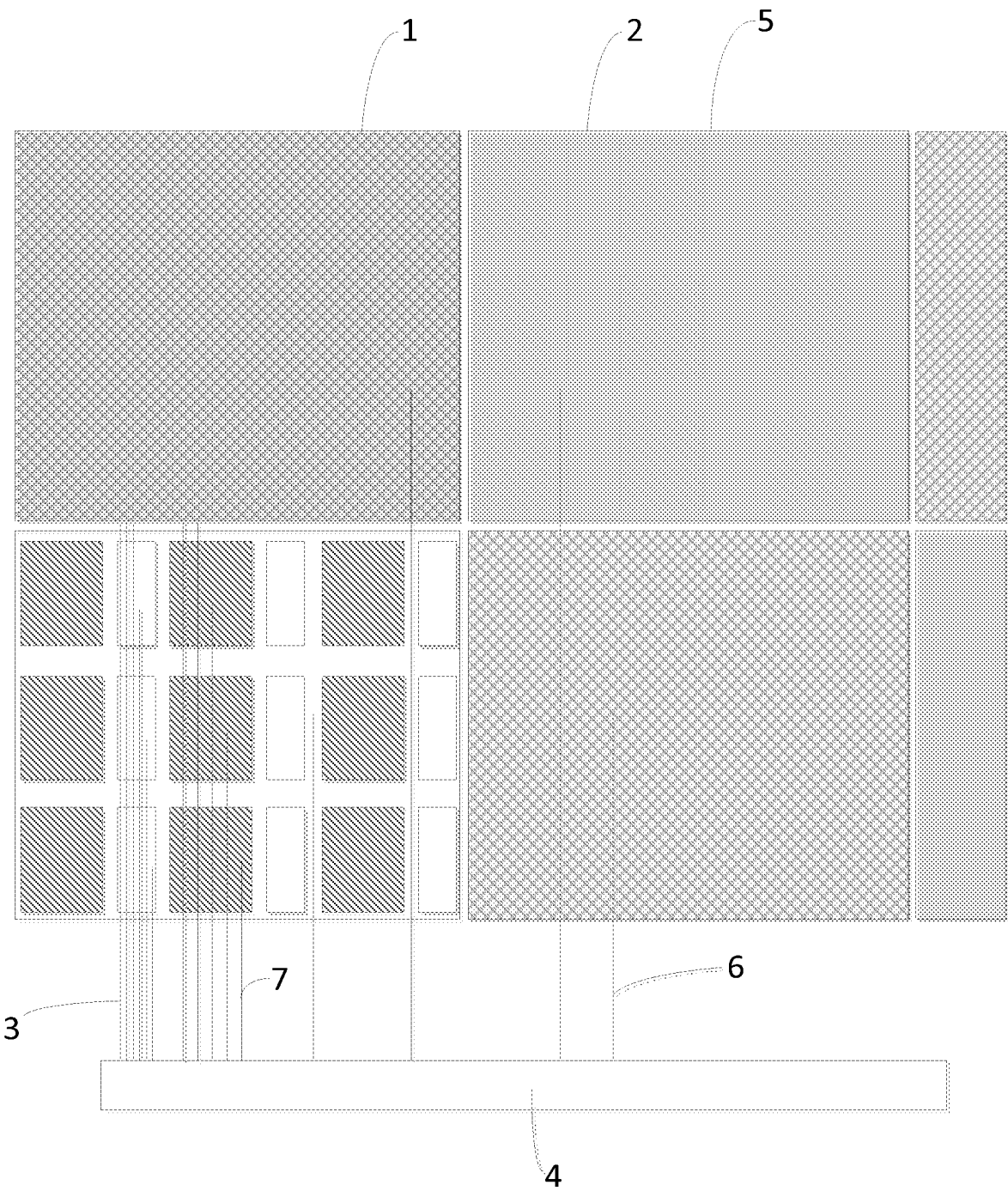
FIG. 2 is a structural schematic diagram of another stretchable display panel provided by at least one embodiment of the present disclosure.

FIG. 2 shows a structural schematic diagram of another stretchable display panel provided by at least one embodiment of the present disclosure. As shown in FIG. 2, the stretchable display panel comprises: a plurality of pixel units 1 arranged in an array, a plurality of compensating pixels 2 located at a gap of pixel units 1, the compensating pixel 2 includes a compensating pixel electrode 21, and each compensating pixel electrode 21 is connected with a control unit 4 through at least one first detecting line 3; and the stretchable display panel further comprises a plurality of touch electrodes 5 located above the pixel units 1, each touch electrode 5 is connected with the control unit 4 through a second detecting line 6. For example, in some embodiments, the second detecting line 6 is multiplexed as a stretch detecting member; or, in other embodiments, the touch electrode 5 is multiplexed as the stretch detecting member; or, in other embodiments, both the second detecting line 6 and the touch electrode 5 are multiplexed as the stretch detecting member.

For example, in some embodiments, as shown in FIG. 2, an extension direction of the second detecting line 6 may be the same as a first stretchable direction of the stretchable display panel, and the first stretchable direction is, for example, a common stretching direction of the stretchable display panel, such as a stretching direction when the stretchable display substrate is folded or a stretching direction generated when stretchable display substrate is worn. For example, when the second detecting line 6 is multiplexed as the stretch detecting member, the second detecting line 6 is made of a material that can generate an electrical detecting signal when being stretched, so that the second detecting line 6 can generate a detecting signal when being stretched; when the stretchable display panel is stretched along a column direction, the second detecting line 6 is also stretched along the column direction, and at this time, the second detecting line 6 generates the detecting signal, and transmits the same to the control unit 4; and the control unit 4 receives the detecting signal, and determines stretch information of the stretchable display panel, for example, a stretched position and a stretch degree of the stretchable display panel, according to a magnitude of the detecting signal. For example, the greater the detecting signal generated by the second detecting line 6, which demonstrates the greater the stretch degree of the stretchable display panel, and the larger the compensating voltage that the control unit inputs to the compensating pixel electrode 21 through second detecting line 6; so the control unit 4 can determine the compensating voltage of the compensating pixel electrode 21 at the stretched position according to light-emitting brightness of the pixel unit 1 and the stretch degree at the stretched position.

For example, each pixel unit 1 has certain light-emitting brightness before stretching; after the stretchable display panel is stretched, each pixel unit 1 will lose a portion of the light-emitting brightness; there is a correspondence relationship between a loss amount and the stretch degree, the greater the stretch degree of the stretchable display panel, the greater the loss amount. For example, the stretch degree of the stretchable display panel is divided into three levels of 1, 2 and 3 which gradually increase; when the stretch degree is 1, the pixel unit 1 loses 10% of the light-emitting brightness before stretching; when the stretch degree is 2, the pixel unit 1 loses 20% of the light-emitting brightness before stretching; and when the stretch degree is 3, the pixel unit 1 loses 30% of the light-emitting brightness before stretching; so, the control unit 4 may determine brightness loss amounts of the respective pixel units 1 at the stretched positions according to the stretch degrees of the stretchable display panel, so that the control unit 4 may determine a magnitude of a corresponding compensating voltage input to a corresponding compensating pixel electrode 21 according to the brightness loss amount, to make light-emitting brightness of the compensating pixel close to brightness lost by the pixel unit 1, and in this way, after compensation, display effects of the stretchable display panel before and after stretching may be made close, which can maintain display quality of the stretchable display panel to a largest extent.

For example, in some embodiments, when the touch electrode 5 is multiplexed as the stretch detecting member, only the touch electrode needs to be made of a material that can generate an electrical signal when being stretched, so that when the stretchable display panel is stretched, the touch electrode 5 may generate a detecting signal, the detecting signal is transmitted to the control unit 4 through the second detecting line 6; and the control unit 4 receives the detecting signal, determines the stretched position and the stretch degree of the stretchable display panel according to a magnitude of the detecting signal, then determines a magnitude of the compensating voltage of the compensating pixel electrode 21 at the stretched position according to the light-emitting brightness of the pixel unit 1 and the stretch degree at the stretched position, and supply the compensating voltage to the compensating pixel electrode 21. A compensation principle of using the touch electrode 5 as the stretch detecting member is the same as the above-described principle of using the second detecting line 6 as the stretch detecting member, the above-described embodiments may be referred to for details, which will not be repeated here.

For example, in some embodiments, an orthogonal projection position of each of the plurality of touch electrodes 5 on the display panel (e.g., on a surface of the stretchable display panel) is in one-to-one correspondence with an orthogonal projection position of each of the plurality of compensating pixels 2 on the display panel. For example, in a direction perpendicular to a surface of the stretchable display panel, the plurality of touch electrodes 5 and the plurality of compensating pixels 2 overlap with each other in one-to-one correspondence relationship. Thus, each touch electrode 5 may respectively and correspondingly detect a stretch degree and a stretched position at a position where each compensating pixel 2 is located, to further implement compensating voltage supply to each compensating pixel 2.

For example, in some embodiments, an orthogonal projection position of each of the plurality of touch electrodes 5 on the display panel (e.g., on a surface of the stretchable display panel) corresponds to orthogonal projection positions of two or more of the plurality of compensating pixels 2 on the display panel. For example, in the direction perpendicular to a surface of the stretchable display panel, each touch electrode 5 correspondingly overlaps with two or more compensating pixels 2. For example, FIG. 2 shows that each touch electrode 5 correspondingly overlaps with 9 compensating pixels 2. Thus, each touch electrode 5 may respectively and correspondingly detect a stretch degree and a stretched position at a position where a plurality of compensating pixels 2 are located, to further implement compensating voltage supply to a plurality of compensating pixels 2. The solution can reduce the number of second detecting lines 6, to further simplify circuit arrangement of the stretchable display panel.

For example, in some embodiments, the second detecting line 6 and the touch electrode 5 may be multiplexed as the stretch detecting member at a same time; at this time, both the second detecting line 6 and the touch electrode 5 may generate detecting signals when the stretchable display panel is stretched; then the control unit receives the detecting signals, determines the stretched position and the stretch degree of the stretchable display panel according to magnitudes of the detecting signals, then determines a magnitude of the compensating voltage of the compensating pixel electrode 21 at the stretched position according to the light-emitting brightness of the pixel unit 1 and the stretch degree at the stretched position, and supply the compensating voltage to the compensating pixel electrode 21. A compensation principle of using the second detecting line 6 and the touch electrode 5 as the stretch detecting member is the same as the above-described principle of using the second detecting line as the stretch detecting member, the above-described embodiments may be referred to for details, which will not be repeated here.

For example, in some embodiments, as shown in FIG. 1 and FIG. 2, the stretchable display panel may further comprise a signal line 7 electrically coupling the respective pixel units 1 to the control unit 4; for clarity and conciseness, both FIG. 1 and FIG. 2 only illustrate signal lines 7 in one-to-one correspondence to one column of pixel units 1; of course, respective pixel units 1 in other columns are also coupled to the control unit 4 through corresponding signal lines 7; and during display, the control unit 4 may input a pixel voltage to a corresponding pixel unit 1 through a signal line 7 for display.

For example, in some embodiments, the stretch detecting member in the stretchable display panel may be made of a material that can generate an electrical detecting signal when being stretched, for example, the greater the stretch degree, the greater the electrical detecting signal generated by the material, which may be further used for judging the stretch degree. For example, the material that can generate an electrical detecting signal during stretching may include a material such as a power generation yarn (e.g., a Twistron power generation yarn) or a polyimide film.

The Twistron power generation yarn was developed by scientists from the University of Texas at Dallas in the United States of America and Hanyang University in South Korea; it is essentially a capacitor without an external power supply, and is spun from many carbon nanotubes; a single carbon nanotube is a hollow cylinder with a diameter of one ten thousandth of a diameter of a human hair; and after being stretched each time, the Twistron power generation yarn generates electrical energy that can light a small light-emitting diode. The polyimide film is a new material developed by researchers from Swiss Federal Laboratories for Materials Science and Technology (EMPA); the polyimide film is a thin and flexible rubber film that can generate power through mechanical stress. The polyimide film can generate electrical energy during stretching and shrinking.

For example, in some embodiments, in order to prevent a gap between light-emitting pixel units 1 from being too large when the stretchable display panel is not stretched, in the above-described stretchable display panel, as shown in FIG. 1 and FIG. 2, a size of a compensating pixel in the row direction may be less than or equal to a size of a pixel unit 1 in the row direction; for example, a size of a compensating pixel in the column direction may also be less than or equal to a size of a pixel unit 1 in the column direction.

Figure 3:
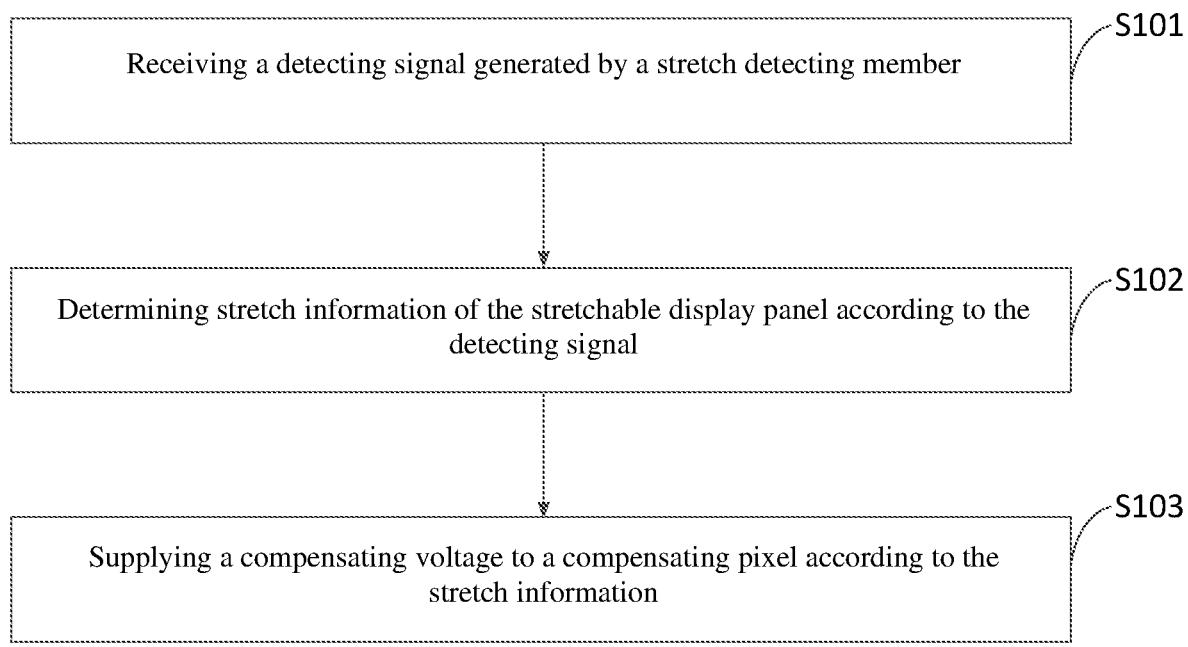
FIG. 3 is a flow chart of a display method of a stretchable display panel provided by at least one embodiment of the present disclosure.

At least one embodiment of the present disclosure further provides a display method of a stretchable display panel; and as shown in FIG. 3, the method comprises steps S101 to S103.

S101: receiving a detecting signal generated by a stretch detecting member.

S102: determining stretch information of the stretchable display panel according to the detecting signal.

S103: supplying a compensating voltage to a compensating pixel according to the stretch information.

Figure 4:
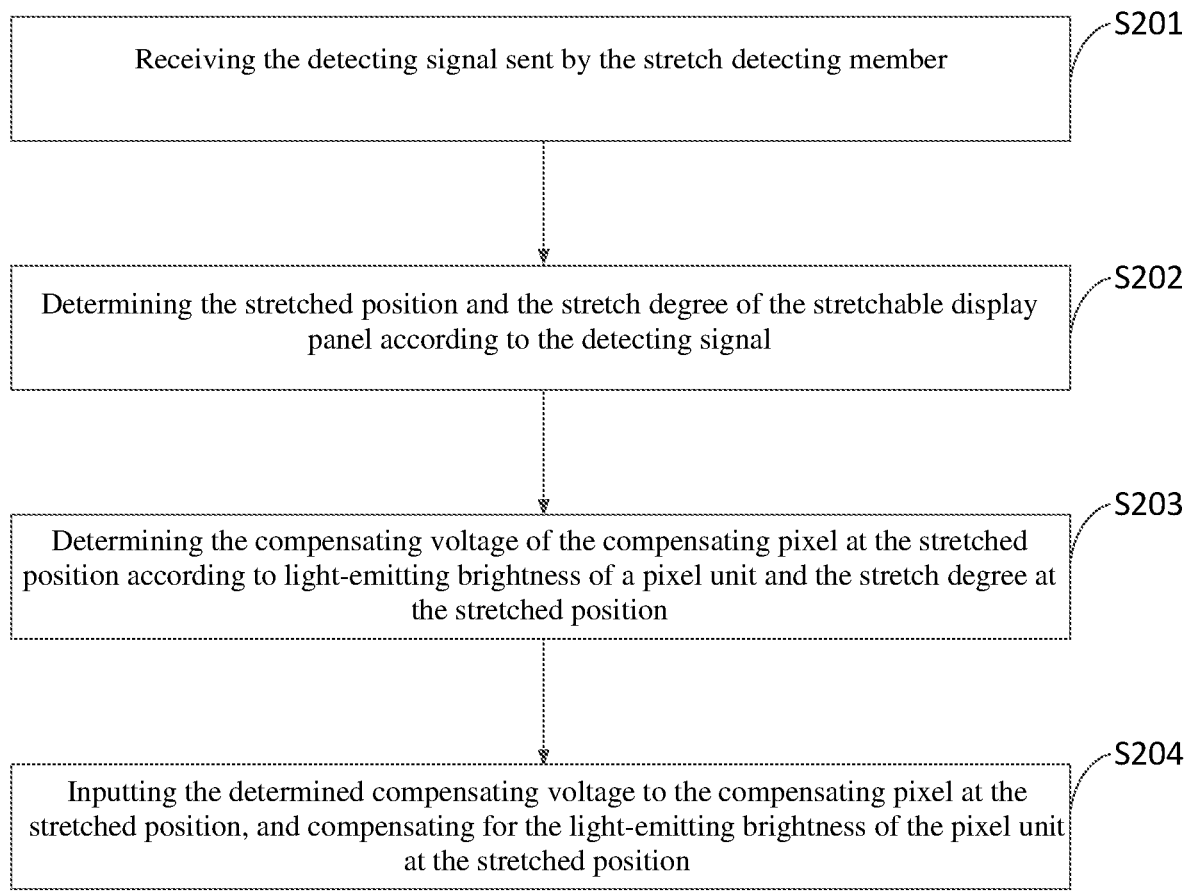
FIG. 4 is another flow chart of a display method of a stretchable display panel provided by at least one embodiment of the present disclosure.

For example, in some embodiments, the stretch information of the stretchable display panel includes a stretched position and a stretch degree of the stretchable display panel, and at this time, as shown in FIG. 4, the display method of the stretchable display panel may comprise steps S201 to S204.

S201: receiving the detecting signal sent by the stretch detecting member.

S202: determining the stretched position and the stretch degree of the stretchable display panel according to the detecting signal.

S203: determining the compensating voltage of the compensating pixel at the stretched position according to light-emitting brightness of a pixel unit and the stretch degree at the stretched position.

S204: inputting the determined compensating voltage to the compensating pixel at the stretched position, and compensating for the light-emitting brightness of the pixel unit at the stretched position.

For example, in some embodiments, the determining the compensating voltage of the compensating pixel may include: the greater the received detecting signal, the larger the compensating voltage of the compensating pixel. In this way, after compensation, display effects before and after stretching may be made close, which can maintain display quality of the stretchable display panel to a largest extent.

For specific implementation processes and principles of respective steps in the above-described display method provided by the embodiment of the present disclosure, corresponding implementation processes of the above-described stretchable display panel may be referred to, for example, the above related description of the stretchable display panel in conjunction with FIG. 1 and FIG. 2 may be referred to, and no details will be repeated here.

At least one embodiment of the present disclosure further provides a display device, and the display device comprises any one of the above-described stretchable display panels provided by the embodiments of the present disclosure. A principle on which the display device solves the problem is similar to that of the above-described stretchable display panel, so the foregoing embodiment of the stretchable display panel may be referred to, and no details will be repeated here.

For example, the display device may be a foldable display device, or a wearable display device, etc., for example, it is applicable to a wearable device such as a wristband, for example, applicable to a stretchable wristband, and at this time, stretch of the stretchable display panel in a row direction may be regarded as enlargement of a perimeter of the stretchable wristband, and stretch of the stretchable display panel in a column direction may be regarded as enlargement of an area of the stretchable wristband.

In the above-described stretchable display panel and the display method thereof, and the display device provided by the embodiments of the present disclosure, the compensating pixel is provided at the gap between the pixel units; when the stretchable display panel is stretched in a display state, the stretch information, for example, the stretched position and the stretch degree, of the stretchable display panel, may be determined according to the detecting signal generated when the stretch detecting member is stretched; the compensating voltage of the compensating pixel at the stretched position is determined according to the light-emitting brightness of the pixel unit and the stretch degree at the stretched position; and the compensating voltage is input to the compensating pixel to implement light emission of the compensating pixel; so, although an interval between adjacent pixel units increases when the stretchable display panel is stretched, yet light emission of the compensating pixel may solve the problem of reduced resolution of the stretchable display panel after being stretched, so that the display panel has similar resolution before and after being stretched, which improves a display effect of a picture, and improves user experience.

For the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or a region may be enlarged or reduced, that is, the accompanying drawings are not drawn according to the actual scale.

(3) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The invention claimed is:

1. A stretchable display panel, comprising:
   a plurality of pixel units, arranged in an array,
   a plurality of compensating pixels, located at a gap between the plurality of pixel units,
   a stretch detecting member, corresponding to the plurality of compensating pixels, including a material that is capable of generating an electrical detecting signal when being stretched, so that the stretch detecting member is capable of generating a detecting signal when being stretched;
   a control unit respectively, electrically connected with the stretch detecting member and the plurality of compensating pixels; and
   a plurality of touch electrodes, each of the plurality of touch electrodes being connected with the control unit through at least one second detecting line, the touch electrode being multiplexed as the stretch detecting member, or both the second detecting line and the touch electrode being multiplexed as the stretch detecting member,
   wherein the control unit is configured to determine stretch information of the stretchable display panel according to the detecting signal generated when the stretch detecting member is stretched, and supply a compensating voltage to the compensating pixel according to the stretch information,
   wherein each of the plurality of touch electrodes is made of a material which is capable of generating an electrical detecting signal when being stretched,
   wherein a material of the stretch detecting member and the touch electrodes includes a power generation yarn, the power generation yarn is made of a plurality of carbon nanotubes.

2. The stretchable display panel according to claim 1, wherein the stretch information includes a stretched position and a stretch degree of the stretchable display panel; the control unit is configured to determine a compensating voltage of the compensating pixel at the stretched position, according to light-emitting brightness of a pixel unit and the stretch degree at the stretched position, and input the determined compensating voltage to the compensating pixel at the stretched position, so as to compensate for the light-emitting brightness of the pixel unit at the stretched position.

3. The stretchable display panel according to claim 1, wherein an orthogonal projection position of each of the plurality of touch electrodes on the display panel is in one-to-one correspondence with an orthogonal projection position of each of the plurality of compensating pixels on the display panel.

4. The stretchable display panel according to claim 1, wherein an orthogonal projection position of each of the plurality of touch electrodes on the display panel corresponds to orthogonal projection positions of two or more of the plurality of compensating pixels on the display panel.

5. The stretchable display panel according to claim 1, wherein an extension direction of the second detecting line is a same as a first stretchable direction of the stretchable display panel.

6. The stretchable display panel according to claim 1, wherein the plurality of pixel units are arranged in a plurality of rows and a plurality of columns; and one column of the compensating pixels are disposed at a gap between two adjacent columns of the pixel units.

7. The stretchable display panel according to claim 6, wherein one column of the compensating pixels are disposed at a gap between any two adjacent columns of the pixel units.

8. The stretchable display panel according to claim 6, wherein a size of the compensating pixel in the row direction is less than or equal to a size of the pixel unit in the row direction.

9. The stretchable display panel according to claim 7, wherein one row of the compensating pixels are disposed at a gap between any two adjacent rows of the pixel units.

10. The stretchable display panel according to claim 9, wherein a size of the compensating pixel in the row direction is less than or equal to a size of the pixel unit in the row direction; and a size of the compensating pixel in the column direction is less than or equal to a size of the pixel unit in the column direction.

11. The stretchable display panel according to claim 1, wherein a material of the stretch detecting member includes a power generation yarn or a polyimide film.

12. A display device, comprising the stretchable display panel according to claim 1.

13. A display method of the stretchable display panel according to claim 1, comprising:
   receiving a detecting signal generated by a stretch detecting member;
   determining stretch information of the stretchable display panel according to the detecting signal; and
   supplying a compensating voltage to a compensating pixel according to the stretch information.

14. The display method of the stretchable display panel according to claim 13, wherein the stretch information includes a stretched position and a stretch degree of the stretchable display panel; and the supplying a compensating voltage to a compensating pixel according to the stretch information, includes:
   determining the compensating voltage of the compensating pixel at the stretched position according to light-emitting brightness of a pixel unit and the stretch degree at the stretched position;
   inputting the determined compensating voltage to the compensating pixel at the stretched position, and compensating for the light-emitting brightness of the pixel unit at the stretched position.

15. The display method of the stretchable display panel according to claim 14, wherein the determining the compensating voltage of the compensating pixel, includes:
   the greater the received detecting signal, the larger the compensating voltage of the compensating pixel.

* * * * *